May 15, 1951  E. P. WENZELBERGER  2,552,525
APPARATUS FOR THE DEHYDRATION OF WATER BEARING SUBSTANCES
Filed July 30, 1949
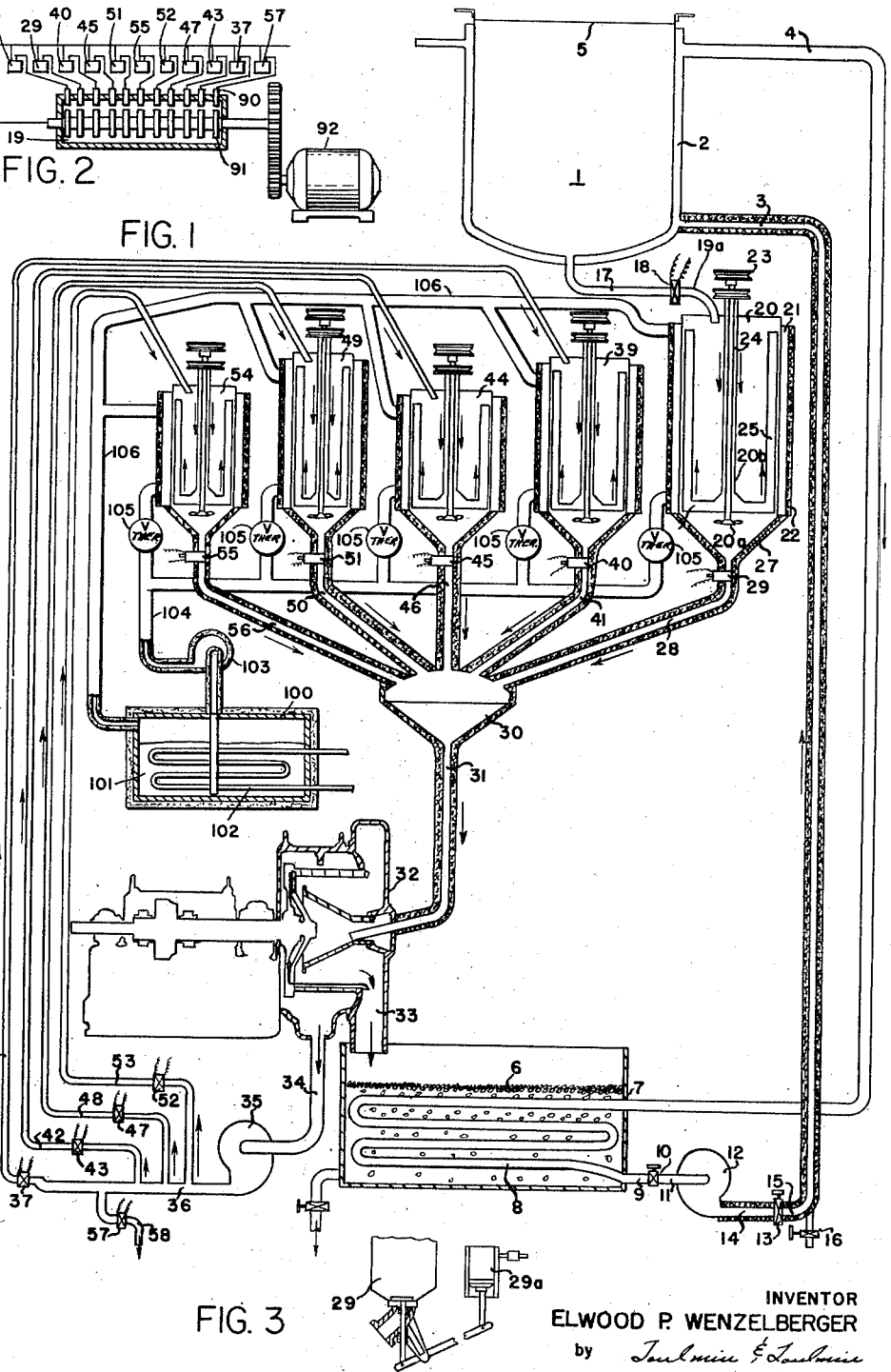
INVENTOR
ELWOOD P. WENZELBERGER
by Toulmin & Toulmin
ATTORNEYS Patented May 15, 1951

2,552,525

UNITED STATES PATENT OFFICE 2,552,525

APPARATUS FOR THE DEHYDRATION OF WATER-BEARING SUBSTANCES

Elwood Paul Wenzelberger, Dayton, Ohio, assignor to The Commonwealth Engineering Company of Ohio, Dayton, Ohio, a corporation of Ohio Application July 30, 1949, Serial No. 107,746

12 Claims. (Cl. 62—124)

My invention relates to an apparatus for dehydration by freezing of liquid bearing substances, particularly those that are heat sensitive.

It is the particular object of my invention to provide a rapid and economical means of removing water from fruit juices, beer, wines, pharmaceuticals such as antibiotics, heat sensitive resins, coffee, milk and vegetable juices. This list is not exclusive, but is typical.

The particular object of the mechanism is to provide for progressively freezing a juice by which the initial freezing results in fine crystals which will form in the juice and which can be readily separated from the juice. The concentrate then is delivered, ice free, or in a condition in which there is a small amount of seed ice, to the next successive freezing station at a lower temperature. This results in a concentrate from which nothing has been removed except the water and the temperature does not affect the vitamins, volatile oils, tastes or other characteristics of the product. Heat, vacuum, pressure, etc. have been eliminated.

It is a further object to reduce the power load and the time factor in processing by eliminating the necessity for very low sub zero temperatures. It is an object to eliminate the time apparatus and power factor in the use of heat and vacuum.

It is an object to provide an apparatus in which a super cooled liquid having a certain percentage of solids will have its temperature reduced from its approximate initial congealing point by stages while, at the same time, preventing the formation of white ice and of solid freezing through the production of relatively small ice crystals, substantially free of solids, the substance being kept in the state of agitation. It is an object to associate with this stage system a high volume heat exchange capacity in association with means for bringing new surfaces of liquid in contact with the freeze surfaces rapidly, with means for ample cooling or freezing area and with means for providing a flow of refrigerant capable of removing the heat as fast as it is absorbed. It is an object of this invention to provide a system of heat exchange utilizing a load of heat transfer by a high capacity for heat absorption into the refrigerant medium. The ice thus formed forms a fine crystal ice slush having the maximum ice crystal area, and continues movement for further reseeding and formation of ice crystals for the extraction of water.

It is an additional object to provide that the difference in temperature between the refrigerant and the juice is also the approximate difference in number of degrees between the liquid bearing the solids at different stages. It will be observed in this process instead of using a very low temperature and endeavoring to reduce the temperature as fast as possible to get the maximum freezing, this process uses the opposite course of a relatively small differential between the temperature of the liquid bearing the solids and refrigerants and a small differential between the stages and the major portion of the stages is at a temperature usually above zero Fahrenheit.

It is a further object to provide means of agitation to prevent the adherence of ice to the wall of the container, to maintain the ice in the state of continual controlled agitation so that the crystal growth is promoted through fine crystals having a maximum area and so that the ice can be readily removed with a minimum of juice and solids entrained in the ice. This also facilitates the movement of the juice and ice to a centrifuge.

It is a further object to provide a common header for receipt of the juice and ice from the several stages and a common centrifuge.

It is an additional object to return the juice from the first stage to the second stage and from the second stage to the third stage in ice free condition.

It is an additional object to utilize the ice and ice-water for reduction of the refrigeration load and for use in the initial precooling of the raw juice supply.

It is the object of this invention to provide a controlled series of decreasing temperatures on each container for each batch of dehydrated juice; to utilize the ice in one container, to partially reseed the dehydrated juice in the next container and to selectively remove the juice from each container independently of the other containers and remove the ice from the juice so removed and return the concentrated juice to the next container ice free or substantially ice free and ultimately to remove the finally dehydrated juice for packing.

It is my particular object to provide a continuous system which can be automatically controlled for the foregoing purposes so that no manual attention is needed except to a minor degree.

It is a further object to provide for rapid dehydration through rapid crystal formation by having the large crystal aggregates broken up by agitation into small crystals. It is to be understood that, if white ice forms, it is exceedingly difficult to remove and has a tendency to clog and plug the mechanism and causes great difficulty in entrainment of juices and solids.

It has also been found that these crystals, formed in suspension, yield a more concentrated solution, which, in turn, has a lower ice forming temperature. This process can be continued until the solution will freeze as a homogeneous mass and no more ice separates. This process is normally stopped short of this stage.

Another advantage of this mechanism is that it is unnecessary to fortify the resulting product with raw juice. It is current commercial practice with vacuum treated orange juice as an example to fortify the juice when dehydrated by adding about 25 per cent of raw juice.

Concentration by my mechanism can be carried to a high degree with no injury to the juice; and it can be reconstituted in the hands of the user by the addition of requisite water. Nothing is lost from the juice except water and nothing is added. Heat is eliminated so as not to disturb heat sensitive materials being processed.

In the light of the foregoing, the drawings illustrating one form of the mechanism for practice in this process will be more fully understood.

Referring to the drawings:

Figure 1 is a diagrammatic view of the complete mechanism for continuous and progressive dehydration.

Figure 2 is a view of the automatic electric control system.

Figure 3 is a detailed view of a valve used at the bottom of the discharge freezing tank.

It will be observed that the process of this invention is based on the principle of pure ice crystal growth and the removal of these ice water crystals from the mother liquor in stages and the regulation of size and movement of the ice crystal to achieve the maximum water extraction without the accumulation of water crystals in the form of white ice and the freezing of such ice in bulk in the container which prevents its removal.

The discovery that I have made is that, if the temperature desired in each tank is so regulated by a progressive cooling effect and freezing effect from tank to tank, white ice, which will adhere to the tank and stirrers and which will include the juice and solids is eliminated.

The principle involved in my step freeze mechanism is based on the theory that pure ice can be formed as crystals in flotation by controlling the freezing and agitation conditions so that there is a relatively small differential between the ice forming point of the solution and the refrigerating medium, amounting to about a 5° differential. At the same time there must be maintained a uniform and large volume heat exchanging capacity. This results in a low velocity but high capacity heat transfer system. These conditions are obtained by having relatively large surface areas for heat transfer plus agitation in order to allow the entire volume of the liquid to contact the cold surfaces of the freezer very frequently. The result of this tends to produce gradual but uniform crystal growth.

If this uniform heat transfer could be accomplished without any agitation, large crystals would form. The type of agitation I use creates small crystals and serves two other functions.

A wiping blade agitator removes any ice which otherwise would cling to the cold sides of the vessel. This is removed as fast as it forms. This ice immediately acts as a seeding process to grow more crystals throughout the volume of the liquid.

This wiping agitation is performed by a relatively slow speed agitator of about 125 R. P. M.

The other agitator (at higher speed, i. e., about 800-900 R. P. M.) prevents large crystal growth, producing small, pure ice crystals. It also prevents the crystals so formed from floating to the top of the liquid where they would aggregate and coalesce together, to form a solid mass of ice which would occlude juice.

By forming large numbers of individual small crystals, continually in motion in the liquid, they remain unattached to each other with a uniform dispersion of ice crystals in the liquid medium. Being a liquid with ice slush, it becomes easy to transport it or flow it through pipes from one piece of apparatus to another.

The tabulation given later is suggestive of the ratio of temperatures. It has been found that these temperatures, while typical, represent a rule of action that secures the desired result. Rapid freezing, at low temperatures, will cause the formation of white ice, will include in the ice, juice and solids and will disrupt the process.

I have found that by first super cooling a liquid bearing solids and adjusting the difference between the temperature of the liquid and the temperature of the refrigerant by a small differential of approximately 5° and then agitate the liquid bearing the solids or seed with ice crystals or both, the liquid will immediately form ice very rapidly and the temperature rise back to the ice forming or congealing point. To prevent such ice so forming, occluding some of the solution and the solids in the ice and to prevent the crystals of ice from growing large and forming white ice, I provide continuous agitation to prevent super cooling and ice formation at the normal congealing point, particularly in large crystals and in white ice. I secure the result of fine crystals in a large mass. I find it desirable to agitate at slow speed in one direction and simultaneously at high speed in another direction so as to effect the maximum heat transfer at the low differential between the refrigerant on the outside and the liquid bearing the solids on the inside. In order to obtain these fine ice crystals in a relatively pure form without solids, etc., in time, the temperature of the cooling liquid must be held practically at a constant temperature or slightly below the ice forming point. In order to speed the crystal formation of crystal ice free of solids under these temperature conditions, the system must possess high volume heat exchange capacity. This is brought about by, first, agitation, bringing new surfaces of liquid in contact with the freeze surfaces rapidly; second, ample cooling or freezing area; third, flow of refrigerant capable of removing the heat as fast as it is absorbed.

The above process is based upon a system of heat exchange utilizing a low velocity transfer, but containing a high capacity for heat absorption into the refrigerant medium.

I also find it important that the major portion, in many instances, of the stages of progressively lowering the temperature shall be above zero and I also find it important that the successive stages be at relatively small temperature reductions, such as about 5° and that the temperature of the liquid in the second stage should be approximately the temperature of the refrigerant in the first stage and so on. It will be understood that these differentials will vary with the liquids and the solids, but the principle of the operation remains the same. By avoiding extremes of temperature, quick freezing and by maintaining easy stages of lowering temperatures and modest differentials between the refrigerant and the liquid while causing agitation, a steady freezing of small ice crystals will take place and rapid dehydration can be effected without occluding other liquids and solids than water.

By starting, as in the case of orange juice, at a tank temperature of 23° F. above zero, with an outside temperature of 18° F., then a temperature in the next tank of 18° F., with an outside temperature of 13° F., then a tank temperature of 13° F., with an outside temperature of 8° F., and in the fourth tank, a temperature of 8° F., with an outside temperature of 3° F., and in the last tank, a temperature of 3° F., with an outside temperature of —2° F., free clear ice crystals can be secured that are easily maintained by the stirrer, in free movement, with minimum crystal size and the maximum freezing capacity for the temperature applied. This principle of a multiple series of steps, starting the temperature just about at the freezing point of the juice and progressively reducing it and progressively removing water by freezing, enables this result to be secured.

In order to economize refrigeration, the first two stages are normally connected to one compressor and the remaining stages to another.

1 is a supply tank for raw juice that is maintained at a temperature of about 34° F. through the circulation of ice-water, previously cooled by the ice, through the jacket 2, supplied by the pipe 3 and discharged through the pipe 4. A cover 5 is maintained over the raw juice and, where desired, air can be eliminated and other steps taken to preserve the material from contamination, bacteriological and enzyme action. This ice-water is supplied from the melting ice 6 in the tank 7. The refrigerant at 8 passes through the pipe 9, valve 10, pipe 11, pump 12, valve 13, pipe 14, pipe 15, into pipe 3. 16 indicates a valve for a drain. The waste ice-water can be sent to the refrigerating machine for condensation use or otherwise employed for cooling.

The tank 1 is provided with a drain pipe 17, controlled by the electrically operated valve 18. Each of the electrically operated valves, of which 18 is one, is connected to a master sequence contact timer 19 which includes a plurality of cam actuated switch means 90 each operated by one of a series of cams 91 and connected with the several valves 18, 29, 40, 45, 51, 55, 52, 47, 43, 37 and 57. The sequence timer is actuated by a motor 92. The pipe 19a discharges the juice at about 34° temperature into tank 20, which is surrounded by a freezing chamber 21, connected to a suitable source of refrigeration and insulated at 22. The same construction applies to the other tanks. The refrigeration system is conventional and includes a tank 100 having a refrigerated liquid 101 therein. The liquid is refrigerated to the lowest temperature required in the stage freezing operation by a refrigeration coil 102 connected to a conventional condensing unit. Refrigerated liquid is circulated by a pump 103 through the supply line 104 to each of the tanks 20, 39, 44, 49 and 54 under control of separate thermostatic control valves 105. Refrigerated liquid is returned to the tank 100 through the line 106.

In each of the tanks there is a motor driven stirrer comprising a pulley 23, a shaft 24 and vertical and horizontal stirrer blades 25 and 26. In order to facilitate the discharge of the ice and to prevent the discharge from freezing, the discharge hopper 27 has no refrigeration. It is, therefore, at a higher temperature. Likewise, the discharge pipe 28, controlled by the valve 29 has no refrigeration. 29 is actuated by a link mechanism from the solenoid 29a.

The propeller 20a has an 18° pitch. It is driven by a shaft which runs through the center of the hollow wiper shaft 20b for keeping the walls of the container 20 free of ice. The propeller 20a rotates clockwise at 600 to 800 R. P. M. pushing downward and the wiper 20b counter-clockwise at about 125 R. P. M.

The discharge hopper 30 and its drain pipe 31 to the centrifuge 32 are insulated. The centrifuge operates constantly as one of the tanks is always discharging into the centrifuge. The ice is discharged through the port 33 to the tank 7. The ice free, partially dehydrated juice is discharged from the centrifuge 32 through the pipe 34, pump 35, through the pipeline 36, through the valve 37, to the pipe 38, which delivers the dehydrated juice from the first stage into the tank 39.

Usually some small part of ice is entrained purposely in the tank 39 with the incoming juice. If it is not entrained, it is sometimes useful to seed the juice with ice to facilitate the rapid formation about such nuclei of ice crystals. The juice passes from the tank 39 through the valve 40, pipe 41, to the header 30 and is thence delivered through the centrifuge in the same manner as before into the pipe 42, valve 43, to the third tank 44, where it again passes through a valve 45 and the pipe 46, to the header 30. After being centrifuged, the juice passes through the valve 47 and pipe 48 to the tank 49. This concentrated juice passes through the pipe 50 and valve 51, to the header 30. After centrifuging, it passes through the valve 52, pipe 53, to the final tank 54, whence it passes, in its concentrated form to the valve 55, the pipe 56 to the centrifuge and thence through the valve 57, pipe 58, to the point of final packing.

Each time the juice is delivered to its respective tank, a freezing period is allowed in order to produce a new crop of pure ice crystals which are removed in each stage by the centrifuge.

SEQUENCE OF VALVE OPERATION

The supply tank contains original juice (approximately 12%). The automatic timer is set to 0° mark and started with all valve switches in the "on" position.

1. Valve 18 opens, passing 150 gallons to tank 20 and then closes. Juice in tanks approximately 12 to 15 minutes to form ice.
2. Valves 29 and 37 open, discharging through centrifuge and to tank 39.
3. Valves 29 and 37 close.
4. Valve 18 opens to refill tank 20.
5. Valves 40 and 43 open and close, filling tank 44.
6. Valves 29 and 37 open and close, filling tank 39.
7. Valve 18 opens, filling tank 20. Tanks 20, 39 and 44 now full.
8. Valves 45 and 47 open and close, filling tank 49.
9. Valves 40 and 43 open and close, filling tank 44.

10. Valves 29 and 37 open and close, filling tank 39.
11. Valve 18 opens and closes, filling tank 20.
12. Valves 50 and 52 open and close, filling tank 54.
13. Valves 45 and 47 open and close, filling tank 49.
14. Valves 40 and 43 open and close, filling tank 44.
15. Valves 29 and 27 open and close, filling tank 39.
16. Valve 18 opens and closes, filling tank 20.
17. Valves 55 and 57 open and close, discharging finished concentrated juice.
18. Valves 51 and 52 open and close, filling tank 54.
19. Valves 45 and 47 open and close, filling tank 49.
20. Valves 40 and 43 open and close, filling tank 44.
21. Valves 29 and 37 open and close, filling tank 39.
22. Valve 18 opens and closes, filling tank 20.
23. Valves 55 and 57 open and close, discharging finished juice.

This sequence is continued, discharging a batch of finished concentrated juice every 12 to 15 minutes or approximately 4 times per hour, throughout the entire day, each tank filling and discharging in turn, as above.

Fresh raw juice is being fed into the supply tank all during this time in order to maintain a full supply there.

At the end of a run or a period the entire machine is washed down by passing water through the system on the same basis as above without the refrigerant being circulated or any part of the equipment may be washed with a hose stream.

The final product can be either shipped in frozen form in the sense that it is refrigerated, or it can be packed and preserved without refrigeration if the concentration is more than 60 per cent. The sugar enables preservation to be successfully accomplished over an extended period of time at room temperature. It will be understood suitable provisions are taken for sanitation, for the prevention of enzyme action and for the prevention of bacteria and other reasons that might cause spoilage.

The practical operation of the machine in this system not only provides a continuous method, but is a very rapid one in the production of dehydrated juice. The formation of ice is very rapid, the crystals are small, they have very little juice entrained in them, being materially less than a fraction of 1 per cent, and the crystals can be readily utilized for reseeding where necessary by moving from one tank to another. As the raw juice is being supplied to the supply tank continuously, or at intervals, it is possible to have a continuous flow into the main tank at will, so that all tanks in the system are always operating; and the centrifuge, which is common to all tanks, is always operating so that none of the ice or the ice water is wasted, but all of it is applied to the refrigeration of the juice.

The problem of the formation of white ice has been overcome and clear crystal ice is formed by this method. The crystals are small and of great number, possessing the maximum cooling area and the maximum nuclei to facilitate very rapid freezing. The slush is formed rapidly and this slush and the dehydrated liquid can be easily handled by gravity through the system.

FREEZING CONDITIONS AND PROCEDURE

Tank 20 is refrigerated so that the juice introduced into it, from tank 1 at 34° F., is brought down to about 5° below the critical congealing or ice forming point.

Each successive stage of freezing is then maintained at 5° lower than the preceding stage. The refrigerant is controlled for each tank at a differential of 5° lower than the juice in the tank. A typical set of examples of how this works is as follows:

Example I.—12% solids—orange juice

Initial ice forming point—28° F.:
1 tank—juice at 23° F., refrigerant 18° F.
2 tank—juice at 18° F., refrigerant 13° F.
3 tank—juice at 13° F., refrigerant 8° F.
4 tank—juice at 8° F., refrigerant 3° F.
5 tank—juice at 3° F., refrigerant —2° F.

Example II.—10% solids—cider vinegar

Initial ice forming point—32° F.:
1 tank—juice at 27° F., refrigerant 22° F.
2 tank—juice at 22° F., refrigerant 17° F.
3 tank—juice at 17° F., refrigerant 12° F.
4 tank—juice at 12° F., refrigerant 7° F.
5 tank—juice at 7° F., refrigerant 2° F.

Different liquids have different initial congealing points so that a temperature scale is established for each material processed. Various temperatures at which ice crystals may form may be used in each or all tanks.

Typical agitation by the wiper blades is caused by a speed of 125 R. P. M. and of the propeller blades of 700–800 R. P. M. These speeds are varied according to the size of the tank and material being processed.

Suitable mechanism for transferring ice from one tank to another can be employed, but is not shown. It has been found desirable to select the particular tank for delivery to the other tanks according to the necessity for seeding and the type of liquid being processed. A counter-flow of ice, under some conditions, is desirable, but one of the particular advantages of this method is the very rapid freezing by stirring and agitation.

It will be understood that the following claims comprehend various changes in temperature, mechanism, speed of stirring and procedure according to the materials being processed. My copending application, Serial Number 106,576, filed July 25, 1949, covers the method of my invention.

Having fully described my invention, what I claim as new and desire to secure by Letters Patent, is:

1. In a dehydration apparatus, a plurality of tanks, a common header connected to said tanks, a centrifuge connected to said headers, means of returning liquid extracted by said centrifuge to each of said tanks in succession and means in each tank to maintain the contents thereof in a state of turbulence comprising a stirrer scraper operating in one direction and a propeller moving the contents of the tank vertically at right angles to the stirring and shearing action of the stirrer scraper.

2. In a dehydration apparatus, a plurality of tanks, a common header connected to said tanks, a centrifuge connected to said headers, means of returning liquid extracted by said centrifuge to each of said tanks in succession and means in each tank to maintain the contents thereof in a state of turbulence comprising a stirrer scraper operating in one direction and a propeller moving the contents of the tank vertically at right angles to the stirring and shearing action of the stirrer scraper, means of refrigerating said tanks at different temperatures, a main supply tank for pre-cooling adapted to discharge in the first of a series of tanks and means of removing from the centrifuge discharged ice and transmitting ice-water therefrom to a pre-cooling jacket of the precooling tank.

3. In a dehydration apparatus, a plurality of tanks, a common header connected to said tanks, a centrifuge connected to said headers, means of returning liquid extracted by said centrifuge to each of said tanks in succession and means in each tank to maintain the contents thereof in a state of turbulence comprising a stirrer scraper operating in one direction and a propeller moving the contents of the tank vertically at right angles to the stirring and shearing action of the stirrer scraper, means of refrigerating said tanks at different temperatures, a main supply tank for pre-cooling adapted to discharge in the first of a series of tanks and means of removing from the centrifuge discharged ice and transmitting ice-water therefrom to a precooling jacket of the pre-cooling tank, and means comprising valves for controlling the discharge from each of the tanks and for controlling the discharge from the centrifuge to each of the tanks in succession.

4. In a dehydration apparatus, a plurality of tanks, a common header connected to said tanks, a centrifuge connected to said headers, means of returning liquid extracted by said centrifuge to each of said tanks in succession and means in each tank to maintain the contents thereof in a state of turbulence comprising a stirrer scraper operating in one direction and a propeller moving the contents of the tank vertically at right angles to the stirring and shearing action of the stirrer scraper, means of refrigerating said tanks at different temperatures, a main supply tank for precooling adapted to discharge in the first of a series of tanks and means of removing from the centrifuge discharged ice and transmitting ice-water therefrom to a precooling jacket of the precooling tank, and means comprising valves for controlling the discharge from each of the tanks and for controlling the discharge from the centrifuge to each of the tanks in succession, and means of automatically actuating said valves in a predetermined sequence whereby the contents of each tank in succession is delivered to the centrifuge independently of the contents of the other tank and the liquid extracted from the centrifuge is then delivered to the next succeeding tank before the liquid from any other tank is introduced to the centrifuge.

5. In a dehydration apparatus, a precooling tank, a series of freezing tanks with hoppers, means of connecting said hopper in succession to a centrifuge, means of connecting the discharge of the centrifuge for liquid to each of said freezing tanks except the first one and means of controlling the discharge from said tanks to the centrifuge and from the centrifuge to the tanks in sequence, whereby the contents of one tank is passed through the centrifuge and delivered to the next tank in order before the contents of the next tank is passed through the centrifuge.

6. In a dehydration apparatus, a precooling tank, a series of freezing tanks with hoppers, means of connecting said hoppers in succession to a centrifuge, means of connecting the discharge of the centrifuge for liquid to each of said freezing tanks except the first one and means of controlling the discharge from said tanks to the centrifuge and from the centrifuge to the tanks in sequence, whereby the contents of one tank is passed through the centrifuge and delivered to the next tank in order before the contents of the next tank is passed through the centrifuge, and means to cool the contents of each of the tanks at progressively decreasing temperatures.

7. In a dehydration apparatus, a precooling tank, a series of freezing tanks with hoppers, means of connecting said hoppers in succession to a centrifuge, means of connecting the discharge of the centrifuge for liquid to each of said freezing tanks except the first one and means of controlling the discharge from said tanks to the centrifuge and from the centrifuge to the tanks in sequence, whereby the contents of one tank is passed through the centrifuge and delivered to the next tank in order before the contents of the next tank is passed through the centrifuge, and means to cool the contents of each of the tanks at progressively decreasing temperatures, and means of removing from the centrifuge ice and delivering ice-water to the precooling tank jacket to refrigerate the contents of the precooling tank.

8. In combination, in a system of continuous dehydration of water bearing substances comprising a plurality of refrigerated containers, means to cool said containers, at progressively decreasing temperatures; a means for continuous separation of the dehydrated material and ice formed in it; means in each container for rapid agitation to prevent the adherence of ice to the container and reduction of ice crystals to a uniform size, and means of sequentially delivering the liquid and its ice for separation, and the delivery of the dehydrated liquid to the next container of lower temperature and the delivery of the ice and its ice water for precooling of the incoming raw liquid.

9. In combination, a plurality of refrigerated containers, stirrers in each of said containers, means of delivering the contents of each of said containers sequentially to a common centrifuge, means of separating in said centrifuge liquid and ice, means of returning the partially dehydrated liquid to successive containers and means of returning the ice and water, melted therefrom, for precooling the composition to be dehydrated.

10. In a dehydration apparatus, a series of freezing tanks with hoppers, means of connecting said hoppers in succession to a centrifuge, means of connecting the discharge of the centrifuge for liquid to each of said freezing tanks except the first one and means of controlling the discharge from said tanks to the centrifuge and from the centrifuge to the tanks in sequence, whereby the contents of one tank is passed through the centrifuge and delivered to the next tank in order before the contents of the next tank is passed through the centrifuge.

11. In a dehydration apparatus, a plurality of tanks refrigerated to successively lower temperatures, centrifuge means connected to said tanks, means for returning liquid extracted by said centrifuge means to said tanks in succession, and means in each tank to maintain the contents thereof in a state of turbulence comprising a stirrer-scraper means operating in one direction and a liquid circulating means moving the contents of the tank relatively normal to the action of the stirrer-scraper.

12. In combination, in a system of continuous dehydration of water bearing substances comprising a plurality of refrigerated containers, means to cool said containers to progressively decreasing temperatures, means for separation of the dehydrated material and ice formed therein, means in each container for rapid agitation of water bearing substances therein to prevent adherence of ice to the container and provide for forming of clear ice crystals with the water bearing substance retained in a slush ice condition, and means for sequentially delivering the liquid and its ice from one container to the separating means for separation and delivery of the dehydrated liquid to the container of next lower temperature.

ELWOOD PAUL WENZELBERGER.

REFERENCES CITED

The following references are of record in the file of this patent:

UNITED STATES PATENTS

| Number    | Name    | Date          |
|-----------|---------|---------------|
| 1,359,911 | Oman    | Nov. 23, 1920 |
| 1,699,170 | Turnbow | Jan. 15, 1929 |
| 1,915,034 | Vogt    | June 27, 1933 |
| 2,266,766 | Knight  | Dec. 23, 1941 |
| 2,337,317 | Eggert  | Dec. 21, 1943 |